Patented Nov. 7, 1939

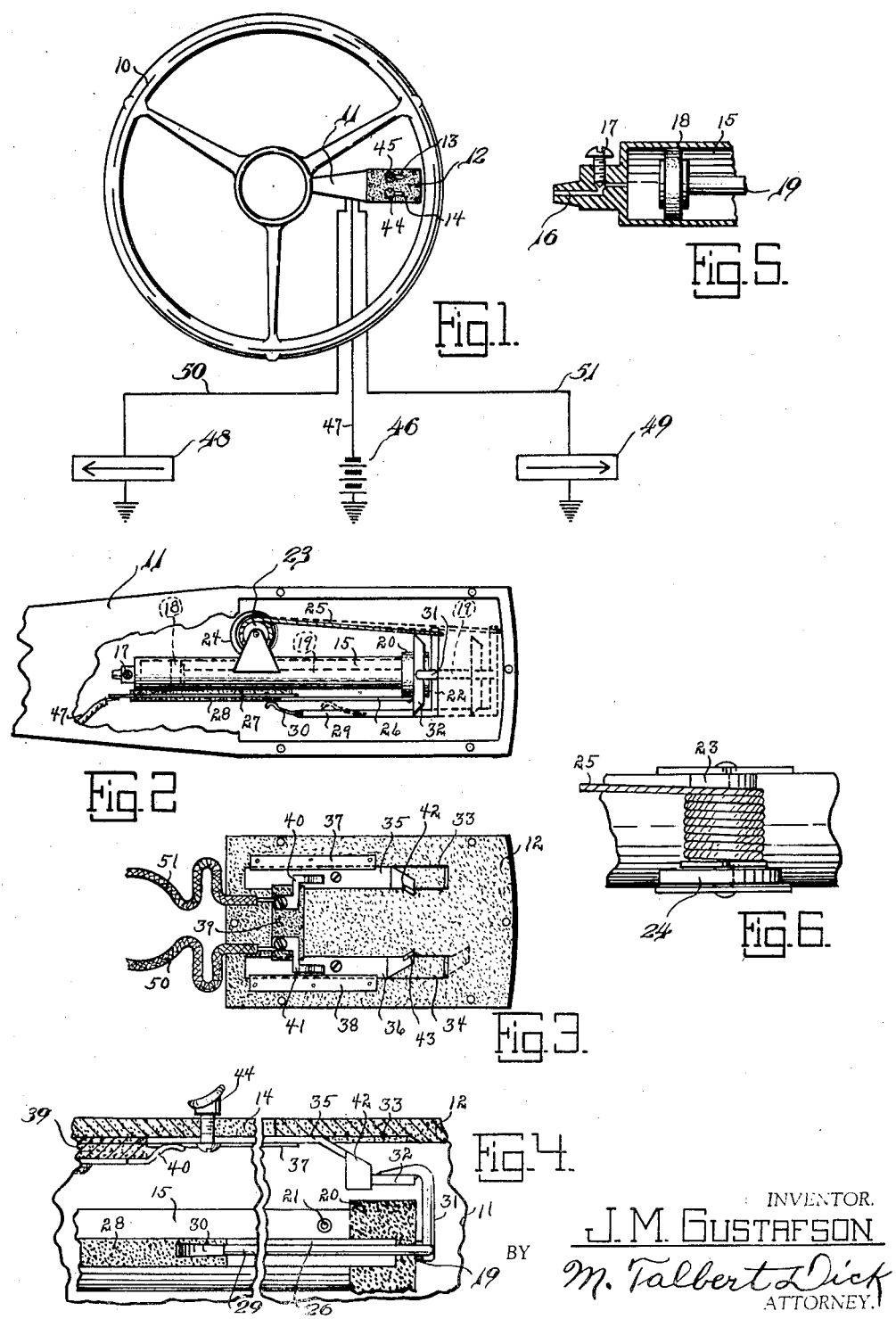

2,178,854

UNITED STATES PATENT OFFICE 2,178,854

MECHANISM FOR OPERATING AN ELECTRICAL SIGNALING SYSTEM

John M. Gustafson, Laurens, Iowa

Application March 29, 1937, Serial No. 133,609

3 Claims. (Cl. 200—34)

The principal object of my invention is to provide a directional signaling apparatus for automotive vehicles such as automobiles, trucks, busses, airplanes, and the like that may be easily, quickly, and conveniently placed in signaling operation by the driver of the vehicle, and after so being placed in operation will, without any further attention from the operator of the vehicle, automatically go into a non-signaling condition after it has performed its function previous to and during the early turning moment of the vehicle to the right or to the left.

A further object of this invention is to provide a mechanism for operating an electrical signaling system that is under the control of the operator at all times.

A still further object of my invention is to provide a directional signaling apparatus for vehicles that may be easily and quickly installed.

A still further object of this invention is to provide a mechanism for operating an electrical signaling system that may be adjusted relative to the length of time the signal will function after the device has been manually placed in signaling condition.

A still further object of my invention is to provide a directional signaling apparatus for automotive vehicles that is quiet in operation.

A still further object of my invention is to provide a mechanism for operating a directional signal that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawing, in which:

Fig. 1 is a top plan view of my apparatus installed and with the wiring and electrical signals connected thereto shown in conventional form.

Fig. 2 is an enlarged top plan view of a portion of my apparatus with its detachable top removed and sections cut away to more fully illustrate its interior construction.

Fig. 3 is an enlarged plan view of the under side of the lid portion of my device.

Fig. 4 is an enlarged side sectional view of my device and more fully illustrates its operating mechanism.

Fig. 5 is an enlarged side sectional view of the rear end portion of the air cylinder of the device.

Fig. 6 is an enlarged side view of the return spring mechanism.

Directional signaling devices now used on automotive vehicles usually follow two general principles in their operation, i. e., an ordinary switch in the seating compartment of the vehicle that must be manually placed in "on and off" positions, and switches that are operated automatically by being connected to the steering mechanism of the vehicle. Obviously the objection to the entire controlling of the directional signal by the use of the steering apparatus of the vehicle is objectionable in that the vehicle must be well into the turn before the signal goes on, for otherwise the directional signal would be operated during the making of gradual turns on the road or during the passing of other vehicles. On the other hand, switches that are manually operated are highly objectionable in that the operator usually forgets to turn them off after the turn has been completed. I have overcome such objections and disadvantages by providing a directional signaling apparatus that is easily and quickly manually placed in signaling condition but which will automatically go off after a predetermined interval regardless of the action of the vehicle to which it is installed.

Referring to the drawing, I have used the numeral 10 to designate the steering wheel of a vehicle. The numeral 11 designates the housing of my device which may be secured at any convenient location inside the vehicle, but preferably just below the steering wheel 10 as shown in Fig. 1. This housing 11 has an opening in its top which is closed by a detachable lid 12 of non-conductive material. The numerals 13 and 14 designate two spaced apart longitudinal slot openings in the lid 12. The numeral 15 designates an elongated cylinder mounted inside the housing 11 as shown in Fig. 2. This cylinder 15 has an air outlet passageway 16 in its rear end. This outlet passageway 16 may be adjustably restricted by the needle valve screw 17 as shown in Fig. 5. The numeral 18 designates a piston of non-conductive material slidably mounted inside the cylinder 15 and having a shaft 19. This shaft 19 extends through the outer end of the cylinder 15 and is journaled in the bearing member 20 which is of non-conductive material. The numeral 21 designates an air escape opening in the forward end portion of the cylinder 15. The numeral 22 designates a metallic bar secured at its center point to the outer end of the shaft 19 and located outside of the housing 15. The length of this bar 22 is substantially greater than the diameter of the cylinder 15 as shown in Fig. 2. The numeral 23 designates a drum rotatably mounted to the side of the cylinder 15 and positioned outside of the cylinder 15 as shown in Fig. 2. This drum 23 is yieldingly held in one direction of its rotation by the coil spring 24 as shown in Fig. 6. The numeral 25 designates a non-metallic cable having one end rigidly secured to the drum 23, a portion of its length wound around the drum 23, and its other end secured to one end of the bar 22. The numeral 26 designates a metallic flat member positioned along one side of the cylinder 15 but insulated from the cylinder 15 by insulation 27. This metallic member 26 is located along the outer end portion of the cylinder 15 and is in the same plane with an adjoining strip of insulating material 28 as shown in Fig. 2. The numeral 29 designates a metallic rod having one end secured to the other end of the bar 22 and extending in spaced relationship along the side of the member 26. The numeral 30 designates a metallic spring finger secured to the free end of the metallic rod 29 and capable of slidably engaging the members 26 and 28. The numeral 31 designates an upwardly extending metallic rod connected to the outer end of the shaft 19. The numeral 32 designates a metallic bar secured to the upper end of the member 31 and extending in spaced relationship across the top of the cylinder 15 as shown in Fig. 2 and Fig. 4. This metallic bar 32 is parallel with and rests just below the detachable cover 12. The numerals 33 and 34 designate longitudinal spaced apart channel grooves in the under side of the cover 12 as shown in Fig. 3. These two channel grooves 33 and 34 are below and communicate with the elongated slot openings 14 and 13 respectively. The numeral 35 designates a metallic bar slidably mounted in the groove 33. The numeral 36 designates a similar metallic bar slidably mounted in the groove 34. The numeral 37 designates a member secured to the under side of the cover and overlapping the bar 35. The numeral 38 designates a similar member secured to the under side of the cover 12 and overlapping the bar 36. The numeral 39 designates a block member of non-conductive material overlapping both the bars 35 and 36. By this construction, the members 37, 38 and 39 will prevent the bars 35 and 36 from falling from the grooves 33 and 34 but will permit the longitudinal sliding movement of the bars 35 and 36. The numeral 40 designates a metallic spring finger secured to the member 39 and yieldingly engaging the bar 35. The numeral 41 designates a similar metallic finger rigidly secured to the member 39 and yieldingly engaging the bar 36. The numeral 42 designates a metallic lug on the forward end of the member 35 capable of contacting the member 32 when the member 35 is reciprocated. The numeral 43 designates a similar metallic lug on the forward end of the member 36 also capable of engaging the member 32 when the member 36 is reciprocated. The numeral 44 designates a non-metallic button operatively connected to the member 35 extending through the slot 14 and positioned above the surface of the cover 12. The numeral 45 designates a similar non-metallic button operatively connected to the member 36 extending through the slot 13 and positioned above the cover 12 as shown in the drawing. The numeral 46 designates a battery or other source of electrical energy. The numeral 47 designates an electric lead wire having one end connected to the plus side of the source of electrical energy and its other end electrically connected to the metallic member 26. The numeral 48 designates a left directional signal grounded to the vehicle. The numeral 49 designates a right directional signal grounded to the vehicle. The numeral 50 designates an electric lead wire having one end connected to the metallic finger 41 and its other end connected to the left electrical signal 48. The numeral 51 designates an electric lead wire having one end connected to the finger 40 and its other end connected to the right electrical signal 49.

The practical operation of my device is as follows: When a right hand turn is to be made, the button or lever 44 is moved outwardly in the slot 14. This action moves the bar 42 outwardly in the groove 33. The dotted lines in Fig. 3 show this movement of the bar 35 which when moved will contact the cross member 32 moving the shaft 19 outwardly as shown by dotted lines in Fig. 2. Obviously this will move the piston 18 toward the outer end of the cylinder 15. As the piston 18 is of the usual cup leather construction, it will permit air to pass around it as it is moved outwardly. By this construction, the movement of the piston outwardly will be comparatively easy. Any excess air may pass through the port 21. The movement of the shaft 19 outwardly will, of course, be against the action of the spring 24 which will have a tendency to yieldingly return the piston 18 inwardly. With the piston 18 manually moved outwardly by the knob lever 44, the members 32 and 22 will be moved to a position as shown by dotted lines in Fig. 2 and the finger 30 will yieldingly engage the metallic member 26. With the finger 30 engaging the member 26, the electric current will pass through the electric lead wire 47, thence to the member 26, thence to the finger 30, thence to the member 22, thence to the member 31, and then to the cross bar 32. As the member 35 is in electrical engagement with the member 32, the current passes into the member 35, thence to the spring finger 40, and then through the lead line 51 to the right directional signal 49. Obviously the cylinder 15 and piston 18 will act as a delaying means or dash pot to the movement of the finger 30 from the member 26 and on to the insulation 27. The air at the head of the piston 18 will have to pass through the small passageway 16 before the piston can return to normal by the action of the cable 25. By adjusting the needle valve screw 17, the amount of air passing through the passageway 16 may be regulated and, therefore, the time interval of the normal rate of the piston 18 may be regulated. Obviously, as long as the finger 30 engages and slides along the member 26, the right directional signal may be electrically operated. Any type of left and right electrical directional signals may be employed. By the time the finger 30 approaches the insulation 27, the vehicle to which the device is installed will have already made its right hand turn. As soon as the finger 30 passes over onto the insulation 27, the electrical connection will be broken and the right directional signal will cease to function. When a left hand turn is desired, the button 45 is moved outwardly. This will move the member 36 in the same manner as the member 35 was moved as hereinbefore described. However, when the button 45 is moved, the electric current will pass into the member 36, thence to the metal finger 41 and through the electric lead wire 50 to the left directional signal 48. As above noted, the time that the signals will remain on will depend on the adjustment of the needle valve screw 17. One advantage of my device is that after one of the buttons 44 or 45 has been actuated and the operator changes his mind about making the turn, he may immediately correct the device, manually returning the button so moved to its normal inward position and move the other button outwardly to immediately make electrical connection to signal a turn in the opposite direction from that first contemplated. The spring fingers 40 and 41 will yieldingly hold the members 35 and 36 against rattle and in successful contact with the member 32 throughout the entire signaling period.

From the foregoing, it will readily be seen that I have provided a highly desirable mechanism for the electrical control of electrical directional signals. My device may be easily installed and when manually placed in an operating condition will after a pre-determined time interval automatically break the electrical contact made without any further attention from the operator.

Some changes may be made in the construction and arrangement of my improved mechanism for operating an electrical signaling system without departing from the real spirit and purpose of my invention, and it is my intention to cover by my claims any modified forms of structure or use of mechanical equivalents which may be reasonably included within their scope.

I claim:

1. In a device of the class described, a housing, a cylinder inside said housing, a piston slidably mounted inside said cylinder, a spring means for yieldingly holding said piston toward the inner end of said cylinder, a metallic bar member operatively connected to said piston, a metallic fixed bar, an electric lead wire operatively connected to said fixed bar, a metallic finger operatively connected to said first mentioned bar and capable of slidably engaging said fixed bar when said piston is moved from its normal position in the inner end of said cylinder, a metallic member slidably mounted in said housing, an electric lead wire electrically connected to said metallic member through a conducting finger, and a manually operated handle directly connected to said metallic member to facilitate the sliding movement of said metallic member into electrical contact with said first mentioned bar and for moving said bar and said piston from their normal positions and against the action of said spring means.

2. In a device of the class described, a housing, a cylinder inside said housing, a piston slidably mounted inside said cylinder, a spring means for yieldingly holding said piston toward the inner end of said cylinder, a metallic bar member operatively connected to said piston, a metallic fixed bar, an electric lead wire operatively connected to said fixed bar, a metallic finger operatively connected to said first mentioned bar and capable of slidably engaging said fixed bar when said piston is moved from its normal position in the inner end of said cylinder, a metallic member slidably mounted in said housing, an electric lead wire electrically connected to said metallic member through a conducting finger, a manually operated handle directly connected to said metallic member to facilitate the sliding movement of said metallic member into electrical contact with said first mentioned bar and for moving said bar and said piston from their normal positions and against the action of said spring means, and a means for yieldingly holding said metallic member in any position it is manually placed.

3. In a device of the class described, a housing, a cylinder inside said housing, a piston slidably mounted inside said cylinder, a spring means for yieldingly outside of said cylinder holding said piston toward the inner end of said cylinder, a metallic bar member operatively connected to said piston, a metallic fixed bar, an electric lead wire operatively connected to said fixed bar, a metallic finger operatively connected to said first mentioned bar and capable of slidably engaging said fixed bar when said piston is moved from its normal position in the inner end of said cylinder, a plurality of metallic members slidably mounted in said housing, an electric lead wire electrically connected to each of said metallic members through conducting fingers, and a hand operated lever secured to each of said metallic members to facilitate the independent selective sliding movement of any of said metallic members into electrical contact with said first mentioned bar and for moving said bar and said piston out of their normal positions.

JOHN M. GUSTAFSON.